United States Patent
Voegele (10) Patent No.: US 11,358,448 B2
(45) Date of Patent: Jun. 14, 2022

(54) RETRACTABLE COVER WITH GUIDED AXIAL BEARING

(71) Applicant: Retrax Holdings, LLC, Ann Arbor, MI (US)

(72) Inventor: Tyler Alyce Voegele, Grand Forks, ND (US)

(73) Assignee: RETRAX HOLDINGS, LLC, Ann Arbor, MI (US)

(*) Notice: Subject to any disclaimer, the term of this patent is extended or adjusted under 35 U.S.C. 154(b) by 89 days.

(21) Appl. No.: 16/655,448

(22) Filed: Oct. 17, 2019

(65) Prior Publication Data

US 2021/0114444 A1 Apr. 22, 2021

(51) Int. Cl.
| B60J 7/04 | (2006.01) |
| B60J 7/19 | (2006.01) |
| B62D 33/02 | (2006.01) |
| B60P 7/02 | (2006.01) |

(52) U.S. Cl.
CPC .......... *B60J 7/04* (2013.01); *B62D 33/02* (2013.01); *B60J 7/041* (2013.01); *B60J 7/198* (2013.01); *B60P 7/02* (2013.01)

(58) Field of Classification Search
CPC ...... B60J 7/04; B60J 7/41; B60J 7/198; B63B 2019/185; B63B 2019/18; B63B 19/18; B60P 7/02; B62D 33/02
USPC ........... 296/100.4, 100.6, 98, 100.9, 100.12, 296/100.3, 37.6, 100.03, 100.04, 100.06, 296/100.07; 224/331
See application file for complete search history.

(56) References Cited

U.S. PATENT DOCUMENTS

| | | | |
|---|---|---|---|
| 3,762,763 A * | 10/1973 | Deshores | B60J 7/041 296/100.04 |
| 4,792,178 A | 12/1988 | Kokx | |
| 6,321,819 B1 | 11/2001 | Copp et al. | |
| 6,722,541 B1 * | 4/2004 | Aftanas | B60R 9/00 224/321 |
| 7,093,881 B2 * | 8/2006 | Rusu | B62D 25/10 296/100.02 |
| 7,452,024 B2 * | 11/2008 | Landrith | B60J 7/041 296/100.04 |
| 7,527,324 B1 * | 5/2009 | Clonan | B60P 7/0815 296/183.1 |
| 8,256,820 B2 * | 9/2012 | Spencer | B60R 11/06 296/37.6 |
| 9,296,285 B2 | 3/2016 | Copp et al. | |
| 10,414,256 B2 * | 9/2019 | Frederick | B60J 7/198 |
| 2003/0000154 A1 * | 1/2003 | Ignazio | B63B 17/023 52/66 |

(Continued)

*Primary Examiner* — Dennis H Redder
*Assistant Examiner* — Joyce Eileen Hill
(74) *Attorney, Agent, or Firm* — The Dobrusin Law Firm, P.C.; Bryan S. Lemanski (57) ABSTRACT

A tonneau cover system, comprising: (a) a retractable tonneau cover having a plurality of interconnected panels; (b) a first retainer secured to a first sidewall of a cargo box of a vehicle; and (c) a second retainer secured to an opposing second sidewall of the cargo box, wherein the first retainer and the second retainer are substantially parallel to each other so that the tonneau cover spans between the first retainer and the second retainer; and wherein the plurality of panels each include a bearing positioned within the first retainer to guide the tonneau cover in a direction substantially parallel to a longitudinal axis of the first retainer.

19 Claims, 4 Drawing Sheets

(56) References Cited

U.S. PATENT DOCUMENTS

| | | | |
|---|---|---|---|
| 2016/0280123 A1* | 9/2016 | Rohr | B60J 7/067 |
| 2017/0334275 A1* | 11/2017 | Copp | B60J 7/041 |
| 2018/0118002 A1* | 5/2018 | Koengeter | B60J 7/196 |
| 2018/0118007 A1* | 5/2018 | Facchinello | B60J 7/141 |
| 2018/0345768 A1 | 12/2018 | Frederick et al. | |
| 2019/0054809 A1 | 2/2019 | Bernardo | |

* cited by examiner

RETRACTABLE COVER WITH GUIDED AXIAL BEARING

FIELD

The present teachings generally relate to a tonneau cover, and more specifically, to a retractable tonneau cover guided by one or more axial bearings.

BACKGROUND

Tonneau systems are typically used to cover and protect a cargo bed or unoccupied portion of a vehicle from environmental degradation. Typical tonneau systems include a plurality of structural members that are attached directly to the vehicle to form a frame. A cover is then secured to the frame, preventing moisture, debris, or unwanted objects from entering the cargo bed or unoccupied portion and damaging cargo or the vehicle itself. The tonneau system may include a rigid frame design, such that when fully assembled and attached to the vehicle, the frame creates a unitary structure. The tonneau system may also include one or more rails that movably secures the cover so that the cover may be retracted by rolling or folding the cover onto itself to uncover only a portion of the cargo bed or unoccupied portion.

It may often be desirable to easily open and close a cover to access the cargo bed or unoccupied portion of a vehicle. As a result, a cover may be frequently retracted and/or closed along the rails of the tonneau system, resulting often in the cover being inadvertently misaligned with the rails, thereby requiring additional force to open and close the cover. Sometimes the misalignment may result in the cover being jammed within the rails, thereby preventing a user from properly moving the cover at all. In an attempt to cure misalignment, tonneau systems may often require additional components, thereby making the system more complex and increasing the manufacturing cost. Additionally, tonneau systems having a rail system often require precise alignment of the rails in order for the cover to retract and/or close properly. For example, the tonneau system may require the rails to be almost exactly parallel to properly function. However, given that the rails may generally be mounted to sidewalls of the cargo bed that are frequently not substantially parallel, the cover is unable to properly retract and/or close immediately after installation. As a result, the tonneau systems may generally require complicated spacing and alignment methods for the cover to even retract and/or close, thus adding cost and time.

Examples of tonneau systems may be found in U.S. Pat. Nos. 4,792,178; 6,321,819; and 9,296,285; and U.S. Patent Publication Nos. 2018/0345768; and 2019/0054809, all of which are incorporated herein for all purposes. It would be attractive to have a tonneau system that minimizes the force required to retract and/or close a cover of the tonneau system. What is needed is a tonneau system having one or more bearings to substantially decrease a frictional force between the cover and retaining portions of the tonneau system. It would be attractive to have a tonneau system that prevents misalignment of the cover relative to a retaining portion of the tonneau system. What is needed it a tonneau system having retaining portions that include guide rails to prevent misalignment. It would be attractive to have a substantially rigid tonneau system that is still able to be easily retracted. What is needed is a tonneau system having a plurality of rollable and/or foldable panels that are guided by one or more bearings.

SUMMARY

The present teachings meet one or more of the present needs by providing a tonneau cover system, comprising: (a) a retractable tonneau cover having a plurality of interconnected panels; (b) a first retainer secured to a first sidewall of a cargo box of a vehicle; and (c) a second retainer secured to an opposing second sidewall of the cargo box, wherein the first retainer and the second retainer are substantially parallel to each other so that the tonneau cover spans between the first retainer and the second retainer; and wherein the plurality of panels each include a bearing positioned within the first retainer to guide the tonneau cover in a direction substantially parallel to a longitudinal axis of the first retainer.

The present teachings meet one or more of the present needs by providing a tonneau cover system, wherein: the first retainer includes a supporting portion that supports the tonneau cover, and the supporting portion includes opposing rails so that the bearing of each panel is positioned between the opposing rails and the tonneau cover is guided along the opposing rails; the first retainer prevents vertical or lateral movement of the tonneau cover in a direction other than the direction substantially parallel to the longitudinal axis of the first retainer; the bearings rest upon a rail of the first retainer and guide the tonneau cover along the rail; the first retainer includes at least one rail that guides the bearings and the second retainer is free of a rail; the second retainer includes a sliding contact surface that supports the tonneau cover as the tonneau cover is guided along the at least one rail of the first retainer; a first end of each panel includes the bearing and is positioned within the first retainer, and a second opposing end of each panel is positioned within the second retainer and is free of a bearing; the bearings include a groove, and the opposing rails are at least partially positioned within the groove of the bearings; the first retainer and the second retainer each include an engaging portion having a seal that compressibly contacts the tonneau cover to prevent moisture, debris, or both from entering the retainers; the first retainer and the second retainer each include: (a) a contoured projection that is configured to abut a vertical lip of the sidewalls; (b) a mounting portion that abuts a portion of the sidewalls so that the sidewalls at least partially support the retainers; (c) a supporting portion that at least partially supports the tonneau cover, wherein the supporting portion guides the tonneau cover along the direction substantially parallel to the longitudinal axis of the first retainer; and (d) an engaging portion, the engaging portion including a seal that compressibly contacts the tonneau cover to prevent moisture, debris, or both from entering the retainers; at least one of the opposing rails is spaced apart from a surface of the supporting portion by a spacer; each bearing is secured to each corresponding panel by a threaded fastener so that each bearing and each corresponding panel are substantially coaxial; the bearing of each panel is secured to a terminal end of a crossmember of the panel; or a combination thereof.

The present teachings meet one or more of the present needs by providing a tonneau cover system, comprising: (a) a retractable tonneau cover having a plurality of interconnected panels, at least a portion of the plurality of panels having a bearing secured near a terminal end; and (b) opposing retainers secured to opposing sidewalls of a cargo box of a vehicle so that the tonneau cover extends between the opposing retainers, wherein the tonneau cover is supported by a supporting portion of each retainer; wherein at least one of the opposing retainers includes opposing rails positioned within the supporting portion and a groove of the bearings is guided along the opposing rails to move the tonneau cover.

The present teachings meet one or more of the present needs by providing a tonneau cover system, wherein: a first retainer includes the opposing rails and a second retainer is free of any rails; the second retainer includes a sliding contact surface that supports the tonneau cover as the tonneau cover is guided along the opposing rail of the first retainer; at least one of the opposing rails is spaced apart from the supporting portion by a spacer secured to the supporting portion by one or more fasteners; the first retainer prevents vertical and lateral movement of the tonneau cover in a direction other than a direction substantially parallel to a longitudinal axis of the first retainer; the opposing retainers each further include: (a) a contoured projection that is configured to abut a vertical lip of the sidewalls; (b) a mounting portion that abuts a portion of the sidewalls so that the sidewalls at least partially support the retainers; and (c) an engaging portion, the engaging portion including a seal that compressibly contacts the tonneau cover to prevent moisture, debris, or both from entering the opposing retainers; the bearing of each panel is secured to a terminal end of a crossmember of the panel; or a combination thereof.

The present teachings meet one or more of the present needs by providing: a tonneau system that minimizes the force required to retract and/or close a cover of the tonneau system; a tonneau system having one or more bearings to substantially decrease a frictional force between the cover and retaining portions of the tonneau system: a tonneau system that prevents misalignment of the cover relative to a retaining portion of the tonneau system; a tonneau system having retaining portions that include guide rails to prevent misalignment; a substantially rigid tonneau system that is still able to be easily retracted; a tonneau system having a plurality of rollable and/or foldable panels that are guided by one or more bearings; or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein generally relate to a tonneau cover system that may secure to a cargo bed or unoccupied portion of a vehicle (i.e., a portion of the vehicle adjacent to or outside of a passenger cabin)(hereinafter referred to as "cargo box"). The tonneau cover system may attach to a cargo box of a pickup truck. The cargo box may consist of one or more sidewalls, one or more tailgates, or both. The one or more sidewalls, one or more tailgates, or both may include one or more mating surfaces. For example, the sidewalls may include a vertical lip substantially perpendicular to the ground and configured to mate with a surface of one or more mounting assemblies. The tonneau system may consist of a plurality of tonneau sections. The tonneau sections may be interlocked such that one or more of the tonneau sections are adapted to roll and/or fold onto one or more additional tonneau sections (i.e., a retractable tonneau system). For example, the tonneau sections may be connected by one or more dual linkage hinge assemblies so that the tonneau sections may fold and/or roll onto one another by pivoting the hinges of the dual linkage hinge assemblies. The tonneau sections may be connected using a plurality of side members, crossmembers, panels, retainers, or a combination thereof. Each tonneau section may include one or more side members, one or more crossmembers, or both. The one or more side members, one or more crossmembers, or both may connect to the cargo box using one or more mounting assemblies. For example, the tonneau sections may include a crossmember that spans between opposing retainers (e.g., rails) that are secured to opposing sidewalls of a cargo box. The tonneau cover system may be unitary (i.e., a single connected piece), or may consist of a plurality of tonneau sections. The tonneau cover system may be structurally rigid. For example, the tonneau system may be sufficiently rigid to prevent an object, such as a heavy stone, from damaging the tonneau cover system and entering the cargo box. The tonneau cover system may be flexible such that the one or more sections of the tonneau cover system are movable while a portion of the tonneau cover system remains stationary. The tonneau cover system may be sufficiently flexible so that the tonneau cover system may be rolled onto itself. The tonneau cover system may comprise a uniform material or may comprise a plurality of materials. For example, the tonneau system may include metal side members and crossmembers yet have plastic panels secured to the side members and/or crossmembers. The tonneau system may include a tonneau cover.

The tonneau cover may function to prevent moisture or debris from entering the cargo box or other compartment of a vehicle, such as a pickup truck. The tonneau cover may be configured to protect the cargo box or other compartment from environmental degradation. The environmental degradation may be corrosion, rust, mold/mildew, or a combination thereof, caused by precipitation and other environmental elements. The tonneau cover may be attached to the cargo box by one or more retainers, side members, or both. The tonneau cover may be attached by fasteners, adhesives, or a combination thereof. The fasteners may be screws, bolts, nuts, nails, press-fit clips/buttons, hooks, latches, or a combination thereof. The adhesives may be glue, epoxy, polyurethane, cyanoacrylate, or a combination thereof. However, it is contemplated that the tonneau cover may be movably secured to the cargo box so that the cargo box may freely move to retract (i.e., open and expose a portion of the cargo box), close (i.e., cover the cargo box), or both. The tonneau cover may be flexible. The tonneau cover may be a continuous piece. For example, the tonneau cover may be a fabric that is rolled across a frame created by one or more side members, one or more crossmembers, or both, and attached to the frame in an unrolled state. The tonneau cover may be structurally rigid such that the cover deflects objects to prevent flexing or piercing of the cover. The tonneau cover may be a fabric, metal, polymer, or a combination thereof. The tonneau cover may comprise a plurality of panels that make up the tonneau cover. For example, the cover may include a plurality of individual panels that, when installed, are connected (e.g., secured together) to form a unitary cover. The tonneau cover may include one or more seams. The tonneau cover may be free of seams. The tonneau cover may removably attach to the tonneau cover system such that the tonneau cover may be replaced without uninstalling the tonneau system.

The tonneau cover may include a plurality of panels. The panels may function to prevent moisture or debris from entering the cargo box or other compartment of a vehicle, such as a pickup truck. The panels may function to interconnect between each other to allow the tonneau cover to fold and/or roll onto itself. For example, the panels may be pivotally engaged to one another to form a continuous tonneau cover so that, upon retraction of the tonneau cover, the panels pivot relative to each other to roll onto one another. The panels may interconnect to form a seam between the panels. The seams may be sealed to prevent moisture, debris, or both from entering the cargo box. The panels may extend between opposing sidewalls of the cargo box to form the tonneau cover. The panels may be free of secondary supports that structurally support a weight of the panels. For example, the panels may extend between opposing retainers and may be free of supporting crossmembers. Alternatively, or additionally, the panels may include one or more secondary supports.

The panels may include one or more crossmembers. The crossmembers may function to support the panels. The crossmembers may function to communicate with one or more retainers of the tonneau cover system. The crossmembers may extend between opposing retainers so that the tonneau cover slides along the opposing retainers. The crossmembers may be structurally rigid. The crossmembers may be solid or may be hollow. For example, the crossmembers may be a solid rod or may be a hollow tube. The crossmembers may have one or more channels, one or more grooves, one or more openings, or a combination thereof. The crossmembers may include one or more holes. The one or more holes may receive one or more fasteners to secured secondary attachments to the crossmembers. The panels may be secured to the crossmembers by one or more fasteners. The fasteners may extend partially or completed through the crossmembers. The fasteners may be secured via one or more nuts, washers, or both. The fasteners may be threaded or may be free of threading. For example, the fastener may be a nail, screw, bolt, pin, hook, latch, or a combination thereof.

The crossmember may be supported by one or more retainers. The retainers may function to secure the tonneau cover to the cargo box, a vehicle, or both. The retainers may directly or indirectly secure the tonneau cover to the cargo box. For example, the retainers may be mounted to a portion of the cargo box (i.e., to the one or more sidewalls), and the tonneau cover may rest on a surface of the retainers, thereby indirectly connecting the tonneau sections to the cargo box. The retainer may be a unitary piece or may contain a plurality of components. The retainer may movably engage one or more portions of the tonneau cover when the tonneau cover contacts the mounting assembly. For example, the tonneau cover may be placed on a surface of the retainer, resulting in a portion of the retainer securing the tonneau cover to prevent unwanted movement of the tonneau cover. The unwanted movement may be considered any movement not substantially along or parallel to a longitudinal axis of one or more of the retainers. One or more retainers may be required to install the tonneau cover to the cargo box. For example, a plurality of retainers may be secured along sidewalls of the cargo box to support the tonneau cover. Alternatively, a pair of opposing retainers may span a length of each of the sidewalls to support opposing edges of the tonneau cover (e.g., panels of the tonneau cover, crossmembers of the panels, or both). The opposing retainers may be substantially parallel to each other to allow the tonneau cover to move along the opposing retainers. The retainer may have a length substantially similar to a length of the sidewalls, may have a length shorter than a length of the sidewalls, may have a length greater than a length of the sidewalls, or a combination thereof.

The retainer may abut one or more surfaces of the cargo box so that the tonneau cover may be secured to the cargo box. The retainer may include one or more projections, one or more protrusions, or both that mate to a surface of the cargo box. For example, the retainer may include a projection that is positioned substantially parallel to a vertical lip of the sidewall of a cargo box so that, when installed, the retainers abut a vertical lip of the sidewall in a flush manner (i.e., the abutment is substantially free of gaps between the mounting assembly and the vertical lip). The retainer may abut the sidewall in a manner other than substantially flush. For example, a gap may exist between the retainer and the sidewall, yet the tonneau cover system may still properly function. The retainer may be a unitary piece or may comprise a plurality of components. For example, the retainer may be a single injection-molded piece having a plurality of integrated projections. Alternatively, the retainer may include a body having one or more projections fastened or adhered to a surface of the body. The retainer may be metal, plastic, or both. The metal may be aluminum, copper, steel, iron, tin, bronze, or a combination thereof. The plastic may be polyamide, polycarbonate, polyester, polyethylene, polypropylene, polystyrene, polyurethane, polyvinyl, or a combination thereof. The retainer may be solid or may be hollow. The retainer may be structurally rigid or may be flexible. For example, one or more projections of the retainer may flex during installation to prevent fracturing of the projection. Alternatively, the retainer may be sufficiently rigid to support the tonneau cover, one or more users, additional items, or a combination thereof. The retainer may be configured to support about 500 pounds or more, about 750 pounds or more, or about 1000 pounds or more. The retainer may be configured to support about 2000 pounds or less, about 1750 pounds or less, or about 1500 pounds or less. The retainer may include one or more contoured surfaces. The retainer may be sufficiently free of contoured surfaces (e.g., the surfaces of the retainer are substantially flat).

The retainer may include a mounting portion. The mounting portion may function to abut a surface of the cargo box and maintain a position of the retainer relative to the cargo box. The mounting portion may mate with the one or more sidewalls, one or more tailgates, or both. The mounting portion may extend at an angle substantially perpendicular to the one or more sidewalls, one or more tailgates, or both. The mounting portion may extend at an angle other than substantially perpendicular to the one or more sidewalls, one or more tailgates, or both. For example, the angle between the mounting portion and the one or more sidewalls, one or more tailgates, or both may be about 30 degrees or more, about 45 degrees or more, or about 60 degrees or more. The angle may be about 135 degrees or less, about 120 degrees or less, or about 105 degrees or less (e.g., about 90 degrees). The mounting portion may be structurally rigid to support the tonneau cover, one or more users, other items, or a combination thereof. The mounting portion may be flexible to prevent fracturing of the mounting portion when the vehicle is being operated (e.g., while the vehicle is driven). The mounting portion may be integrally (i.e., monolithically) formed with the retainer or may be a secondary component secured to the retainer. The mounting portion may include one or more surfaces that have a similar contour to one or more surfaces of the cargo box. For example, the sidewall of the cargo box may include a convex surface while the mounting portion includes a concave surface to mate with the sidewall. The mounting portion may be configured to prevent unwanted movement of the retainer. For example, the mounting portion may rest on a top surface of the sidewalls so that the retainer does not slide along a vertical lip of the sidewalls. The mounting portion may be removably attached to the cargo box via one or more fasteners, one or more adhesives, or both. The mounting portion may be free of one or more fasteners, one or more adhesives, or both. For example, the mounting portion may rest on a surface of the cargo box while a contoured projection of the retainer is secured to the cargo box.

The contoured projection may function to abut one or more surfaces of the cargo box so that the retainer may be secured to the cargo box. The contoured projection may be fixedly or removably attached to the cargo box. The contoured projection may be secured to the cargo box using one or more adhesives, one or more fasteners, or both. The contoured projection may include one or more contoured surfaces, one or more substantially flat surfaces, or both. For example, the contoured projection may include a substantially flat surface to abut a vertical lip of a sidewall, and also include an opposing contoured surface configured to engage one or more fastener grooves. The contoured surface and the substantially flat surface may be opposing sides of the contoured projection. The contoured projection may include one or more abrasive surfaces to increase friction between the contoured projection and one or more fasteners. The one or more abrasive surfaces may be complementary in shape to a shape of a gripping portion of the one or more fasteners. The contoured projection may extend at an angle substantially perpendicular to the mounting portion such that the contoured projection and the mounting portion form a right angle. The contoured projection may extend at an angle other than substantially perpendicular to the mounting portion. The contoured projection may be compressible so that the contoured projection is compressed when one or more fasteners secure the contoured projection to the cargo box. The contoured projection may include one or more secondary projections that engage one or more portions of the cargo box. For example, a vertical lip of a sidewall may include a keyhole slot configured to receive a key (i.e., a secondary projection) of the contoured projection. The contoured projection may be secured to cargo box using one or more clamps.

The one or more clamps may function to secure the retainer to the cargo box. The clamps may be configured to clamp the contoured projection to a vertical lip of one or more sidewalls of the cargo box. The clamps may apply a compression force between the contoured projection or other portion of the retainer and the cargo box. The compression force between the retainer and a portion of the cargo box may be about 1000 newtons or more, about 1500 newtons or more, or about 2000 newtons or more. The compression force between the retainer and a portion of the cargo box may be about 3500 newtons or less, about 3000 newtons or less, or about 2500 newtons or less. The clamps may include one or more arms. The one or more arms of the clamps may include a plurality of grooves to maintain a position of the clamp relative to the retainer, the cargo box, or both. For example, one or more arms of the clamp may include a plurality of grooves configured to mate with a contoured surface of the contoured projection. The one or more arms of the clamp may be pivotally engaged to one another. For example, an end portion of a first arm may be received by a projection portion of a second arm, such that the first and second arm are pivotally engaged to each other to create a gap between the arms to receive the retainer, a portion of the cargo box (i.e., a thickness of the vertical lip), or both.

The clamps may include a clamping portion. The clamping portion may function to contact the sidewall of the cargo box when a compression force is applied between the retainer and the sidewall. The clamping portion may extend around a portion of the sidewall to secure the retainer to the sidewall. The clamping portion may extend around a portion of a vertical lip of the sidewall to engage the sidewall and secure the retainer. The clamping portion may be an arm, finger, extension, or a combination thereof of the clamp. The clamping portion may be a hook, a latch, or both. The clamping portion may be a substantially U-shaped projection that extends around a portion of the vertical lip. The clamping portion may be rigid. The clamping portion may be flexible so that, upon a compression force, the clamping portion does not fracture, permanently distort, or both.

The clamping portion may be in communication with a wedge of the clamp. The wedge may function to engage a portion of the retainer during clamping. For example, the wedge may abut a lip of the retainer so that, upon applying a clamping force of the clamp, the wedge may substantially maintain a position of the clamp and only the clamping portion flexes to compressibly engage a portion of the cargo box. The wedge may be integrally formed with the clamping portion. The wedge and the clamping portion may be connected by a flexible portion so that the clamping portion may flex during a clamping operation. The wedge may remain substantially stationary during clamping, release of clamping, or both. The wedge may be positioned within a channel of the retainer. The wedge may abut one or more ledges, projections, notches, shelves, or a combination thereof of the retainer. The wedge may be any desired size and shape to secure the clamp to the retainer. The wedge may include one or more holes to receive a fastener. For example, the fastener may be secured within the retainer and extend through the wedge and the clamping portion. The fastener may be fixed within a slot of the retainer so that the fastener may only rotate to create a clamping force yet be substantially prevented from directional movement outside of rotation.

The slot of the retainer may function to secure a fastener of the clamp. The slot may maintain a position of the fastener so that the fastener may rotate about an axis of the fastener yet be substantially prevented from any directional movement within the slot. The slot may include an opening to secure the fastener. For example, the slot may be a channel having an open portion and one or more ledges surrounding the opening so that a flange and/or head of the fastener may rest on the one or more ledges. The slot may be any desired size and shape to receive the fastener so that the fastener may extend through the slot and connect to a cap of the clamp.

The cap may function to create a clamping force of the clamp. The cap may engage a threading of the fastener of the clamp to create the clamping force. The cap may abut a portion of the clamping portion, the wedge, a flexible portion therebetween, or a combination thereof to create the clamping force. For example, the cap may include a threaded hole to receive a threading of the fastener so that the cap may be tightened around the fastener to decrease a distance between the cap and a head of the fastener, thereby compressing a portion of the clamp to create a clamping force. The cap may rotate relative to the fastener of the clamp to create the clamping force. The cap may rotate along a longitudinal axis of the fastener in a clockwise direction, counterclockwise direction, or both. The cap may have a handle portion so that a user may manually rotate the cap relative to the fastener. The cap may be releasable from the clamp so that a user may remove the cap for replacement, remove the clamp, or both. The cap may provide a clamping force that secures the retainer to the cargo box so that the tonneau cover may be sufficiently supported by a supporting portion of the retainer.

The supporting portion may function to support the tonneau cover. The supporting portion may be positioned substantially perpendicular to the contoured projection of the retainer such that the supporting portion and contoured projection form a right angle. The supporting portion may extend at an angle other than substantially perpendicular to the contoured portion. For example, the angle between the supporting portion and the contoured projection may be about 30 degrees or more, about 45 degrees or more, or about 60 degrees or more. The angle may be about 135 degrees or less, about 120 degrees or less, or about 105 degrees or less. The supporting portion may be structurally rigid or may be flexible. The supporting portion may be configured to support about 200 kilograms or more, about 400 kilograms or more, or about 600 kilograms or more. The supporting portion may be configured to support about 1200 kilograms or less, about 1000 kilograms or less, or about 800 kilograms or less. A surface of the supporting portion may abut a surface of the tonneau cover. For example, a top surface of the supporting portion may abut a bottom surface of the tonneau cover, one or more panels of the tonneau cover, one or more crossmembers of the tonneau cover, or a combination thereof. The supporting portion may support a portion of the tonneau cover or may support an entire surface of the tonneau cover (e.g., about 100% of a bottom surface of tonneau cover is supported by the supporting portion). For example, the supporting portion may support one or more bearings secured to the tonneau cover or crossmembers of the tonneau cover so that a portion of the tonneau cover is free of contact with the supporting portion. The supporting portion may include one or more abrasive surfaces to increase friction between the supporting portion and the tonneau cover. The supporting portion may include one or more holes, grooves, notches, contours, latches, hooks, or a combination thereof to secure the tonneau cover to the supporting portion. The supporting portion may be positioned so that the tonneau cover is aligned to substantially follow a peripheral edge of the cargo box (i.e., the perimeter established by the one or more sides, one or more tailgates, exterior wall of a passenger cabin, or a combination thereof).

The supporting portion may include one or more cover spacers. The cover spacers may function to support the tonneau cover. The cover spacers may support the tonneau cover so that the tonneau cover maintains a desired position within the retainer. For example, a vehicle may have opposing retainers that support the tonneau cover. A first retainer may guide bearings of the tonneau cover and a second opposing retainer may include a cover spacer to allow the tonneau cover to move based on the bearings. The cover spacer may maintain the tonneau cover in a substantially parallel position relative to the supporting portions of the retainers to ensure proper alignment of the tonneau cover relative to the retainers. The cover spacers may be secured to a portion of the retainer by one or more fasteners, one or more adhesives, or both. The cover spacer may be positioned along the supporting portion of the retainer. The cover spacer may extend along an entire length of the retainer or only a portion of the retainer. The retainer may include a plurality of cover spacers that may be spaced apart in a desired manner. The cover spacers may be a block, wedge, bump-out, projection, contour, or a combination thereof.

The supporting portion may include a sliding contact. The sliding contact may function to communicate with a portion of the tonneau cover to guide the tonneau cover between a retracted position and a closed position. The sliding contact may be a surface of the supporting portion. The sliding contact may be secured to a surface of the supporting portion that is in contact with the tonneau cover. The sliding contact may be secured by one or more fasteners, one or more adhesives, or both. The sliding contact may be secured within one or more slots or channels of the retainer. The sliding contact may include one or more bumps, undulations, beads, or a combination thereof. The sliding contact may decrease friction between the tonneau cover and the retainer during movement of the tonneau cover. The sliding contact may include one or more friction modifiers, such as grease, oil, silicone, other lubricant, or a combination thereof.

The tonneau cover may be supported by the supporting portion so that an engaging portion of the retainer engages the tonneau cover. The engaging portion may function to communicate with a portion of the tonneau cover to prevent removal of the tonneau cover, misalignment of the tonneau cover, or both. The engaging portion may work in conjunction with the supporting portion to substantially sandwich the tonneau cover between the engaging portion and the supporting portion. For example, the engaging portion may abut a top surface of the tonneau cover while the supporting portion abuts an opposing bottom surface of the tonneau cover. The engaging portion may be configured to prevent unwanted movement of the tonneau cover during use of the vehicle (i.e., driving the vehicle), use of the tonneau cover system (i.e., retraction of the tonneau cover, closing of the tonneau cover, or both), use of the cargo box, or a combination thereof. For example, the engaging portion may prevent the tonneau cover from shifting from a position substantially abutting one or more sidewalls of a cargo box. The engaging portion may be substantially parallel to the supporting portion. The engaging portion and the supporting may be interconnected to create a channel to receive the tonneau cover. The channel may be C-shaped, U-shaped, V-shaped, or a combination thereof. The engaging portion may extend from the mounting portion, the supporting portion, or both. The engaging portion may include one or more substantially flat surfaces to mate with a surface of the tonneau cover. The engaging portion may be structurally rigid to create a compression force on the tonneau cover supported by the supporting portion of the retainer.

A seal of the engaging portion may contact the tonneau cover. The seal may function to prevent moisture, debris, or other objects from penetrating an interior portion of the retainer. The seal may function to create a seal between the retainer and the tonneau cover. The cover seal may form a seal with a top surface, a bottom surface, or side surfaces of the one or more tonneau sections. The seal may be structurally rigid or may be flexible. For example, the seal may be flexible and configured to form an interference-fit (i.e., the seal contacts the tonneau cover so that the seal is compressed) with one or more surfaces of the tonneau cover. The seal may extend from a surface of the engaging portion. The seal may be substantially straight (e.g., a substantially straight portion projecting from a surface of the supporting portion). The seal may include one or more bends, angles, protrusions, or a combination thereof. The seal may extend along a length of the retainer (i.e., a distance of the retainer substantially parallel to one or more sidewalls of the cargo box). The seal may be a plurality of shorter seals that have a combined length of the retainer. The seal may contact the tonneau cover at an angle substantially parallel to a top surface of the tonneau cover (i.e., a surface substantially parallel to the supporting portion of the retainer). The seal may contact a side surface of the tonneau cover (i.e., a surface substantially perpendicular to the supporting portion of the retainer) at a substantially right angle (approximately 90 degrees between the seal and the side surface). The seal and the side surface may form an angle of about 45 degrees or more, about 60 degrees or more, or about 75 degrees or more. The seal and the side surface may form an angle of about 120 degrees or less, about 105 degrees or less, or about 90 degrees or less. The seal may be adhered to a surface of the engaging portion. The seal may be free of adhesives, fasteners, or both. For example, the seal may be co-extruded with the engaging portion. Alternatively, the seal may be secured in a slot of the engaging portion.

The slot may function to secure the seal to the retainer. The slot may be configured to receive a portion of the seal so that the seal remains secured to the retainer. For example, the slot may include one or more flanges to receive one or more complimentary flanges of the seal. The slot may include one or more channels to receive the seal. The slot may include a "T" shaped channel, a "C" shaped channel, a "U" shaped channel, a "V" shaped channel, a "G" shaped channel, or a combination thereof. The seal may be configured so that a width of the seal is greater than a width of a channel opening so that the seal, once positioned inside the channel of the slot, rests along one or more portions of the channel. The slot may be structurally rigid. For example, the seal may be inserted into the slot from a proximal end, a distal end, or both, and moved along a longitudinal axis (i.e., an axis substantially parallel to one or more sidewalls of the cargo box) to a desired location. The slot may be flexible so that an opening of the slot may be expanded to insert the seal and retracted once the seal is positioned inside the slot. The slot may extend along a length of the engaging portion or the slot may have a length shorter than a length of the engaging portion.

The tonneau cover may be movably secured to the retainer so that the tonneau cover is guided along one or more rails of the retainer. The rails may function to guide the tonneau cover between a closed position (i.e., covering the cargo box) and a retracted position (i.e., rolled onto itself with the cargo box exposed). The rails may be positioned along one or more portions of the retainer. The rails may be positioned on the supporting portion, the engaging portion, or both. For example, a first rail may be secured to the engaging portion while a second rail may be secured to the supporting portion so that the tonneau cover is positioned between the first and the second rail. The rails may be monolithically formed with the retainer or may be secured to the retainer via one or more fasteners, adhesives, or both. The rails may extend along a length of the retainer to guide the tonneau cover between the retracted positioned and the closed position. The rails may be substantially parallel to sidewalls of the cargo box. Alternatively, due to sidewalls of a cargo box potentially being misaligned, the rails may extend substantially parallel to a longitudinal axis of the retainer. The rails may maintain a position of the tonneau cover to prevent misalignment. The rails may allow for movement in a desired direction substantially parallel to sidewalls of the cargo box, a longitudinal axis of the retainers, or both. The rails may prevent movement that is not substantially parallel to an axis of one or more of the rails.

One or more of the rails may support a weight of the tonneau cover. For example, the tonneau cover may be positioned between opposing rails of a retainer so that a bottom rail substantially supports a weight of the tonneau cover. Each retainer may include one or more rails, or a portion of retainers may be free of rails. For example, a first retainer may include one or more rails while an opposing second retainer may be free of rails so that the tonneau cover is guided along the one or more rails of the first retainer while an opposing side of the tonneau cover substantially "floats" within the second retainer. The rails may be a rod secured to the retainer. The rails may be a bump-out, undulation, projection, or a combination thereof of one or more portions of the retainer. For example, the rails may be a bead along an engaging portion of the retainer protected by a seal of the engaging portion to prevent moisture, debris, or both from contacting the rails.

The rails may be spaced apart from the retainer via a rail spacer. The rail spacer may function to space apart a rail so that the rail contacts a desired portion of the tonneau cover. The rail spacer may maintain a position of the tonneau cover within the retainer. For example, the rail spacer may help maintain the tonneau cover at an angle substantially parallel to the supporting portion to decrease friction between the tonneau cover and the retainer, prevent misalignment of the tonneau cover relative to the retainer, or both. The rail spacer may be secured to the supporting portion, the engaging portion, or both. The rail spacer may be secured to the retainer via one or more fasteners, one or more adhesives, or both. The rail spacer may extend along an entire length of the retainer or only a portion of the retainer. The retainer may include a plurality of rail spacers that may be spaced apart in a desired manner. The rail spacer may be a block, wedge, bump-out, projection, contour, or a combination thereof.

The one or more rails of the retainer may communicate with one or more bearings of the tonneau cover. The bearings may function to guide the tonneau cover along the rails between a closed position, a retracted position, any position between the closed position and the retracted position, or a combination thereof. The bearings may be secured along a portion of the tonneau cover that is positioned within the retainer. The bearings may be secured near a peripheral edge of the tonneau cover. For example, the bearings may be secured to terminal ends of one or more interconnected panels of the tonneau cover. The bearings may be secured to crossmembers of the tonneau cover. For example, a bearing may be secured to a terminal end of each crossmember. The bearings may be secured to each panel and/or each crossmember via one or more fasteners. The bearings may be secured to the tonneau cover so that the bearings are free to rotated about an axis of the bearings. The bearings may decrease or substantially eliminate friction between the tonneau cover and the retainers during movement of the tonneau cover. The bearings may be an axial bearing that is guided along the rails of the retainer. The bearings may support a weight of the tonneau cover. The bearings may rest along a portion of the retainer, so the bearings are the only portion of the tonneau cover in contact with the retainer. The tonneau cover may have a single bearing or may include a plurality of bearings. The tonneau cover may have about five or more bearings, about 30 or more bearings, or about 60 or more bearings. The tonneau cover may have about 120 or less bearings, about 100 or less bearings, or about 80 or less bearings. The tonneau cover may have bearings on opposing sides. For example, a first side of the tonneau cover may include one or more bearings guided within a first retainer while a second side of the tonneau cover may also include one or more bearings guided within a second retainer. Alternatively, only one side of the tonneau cover may include one or more bearings. A spacing between the bearings may be any desired distance. The spacing between the bearings may be uniform or may vary.

The bearings may include a groove. The groove may function to receive a portion of the rails. The groove may extend along a periphery of the bearings. The groove may be configured so that, when the bearing is positioned between opposing rails, the groove receives a portion of both of the opposing rails and allows the bearing to be guided along the opposing rails. The groove may be a concave portion of the bearing. The groove may be a convex portion. The groove may be shaped substantially similar to a contour of the one or more rails. The groove may include a friction modifier such as grease, oil, silicone, another lubricant, or a combination thereof. The groove may engage the rails and substantially prevent lateral movement of the tonneau cover (i.e., movement perpendicular to a length of the retainer. The groove may engage the rails and substantially prevent vertical movement of the tonneau cover (i.e., movement parallel to the sidewalls of the cargo box).

The tonneau cover may include a lock that is guided along a retainer based on movement of the bearings. The lock may function to lock the tonneau cover in a desired position (e.g., in a closed position). The lock may engage a portion of the retainer, a tailgate, a sidewall, or a combination thereof to prevent unwanted movement of the tonneau cover. The lock may include a tumbler that requires a key to open. The lock may include one or more latches. The lock may be secured to the tonneau cover. The lock may be mounted to a panel of the tonneau cover via one or more fasteners. The lock may move simultaneously with the tonneau cover. For example, the tonneau cover may be guided along the rails while the lock is simultaneously guided along a lock rail of the retainer.

The lock rail may function to guide the lock when the tonneau cover is in movement. The lock rail may be secured to a portion of the retainer via one or more fasteners, one or more nuts, one or more washers, or a combination thereof. The lock rail may be integrally formed with the retainer or may be mounted to the retainer. For example, the lock rail may be mounted to the supporting portion of the retainer. The lock rail may extend along a length of the retainer so that the lock may move an entire length of the retainer.

The lock rail may include a channel. The channel may function to receive a portion of the lock to guide the lock along the lock rail. The channel may be any desired size and shape. The channel may be positioned anywhere along the lock rail that may communicate with the lock. The channel may have an opening to receive a portion of the lock. The channel may be U-shaped, C-shaped, D-shaped, V-shaped, G-shaped, or a combination thereof. The channel may include one or more flanges around an opening to secure a portion of the lock. The channel may engage the lock in a movable manner so that the lock may move substantially parallel to a longitudinal axis of the retainer. The channel may include one or more flexible portions or may be substantially rigid.

The channel may receive one or more fingers of the lock. The fingers may function to movably secure the lock to the channel. The fingers may at least partially be secured within the channel. The fingers may be any desired size and/or shape. The fingers may be a projection of the lock. The fingers may be structurally rigid or may be flexible. The fingers may include one or more bends, hooks, undulations, arcuate portions, planar portions, or a combination thereof.

Figure 1:
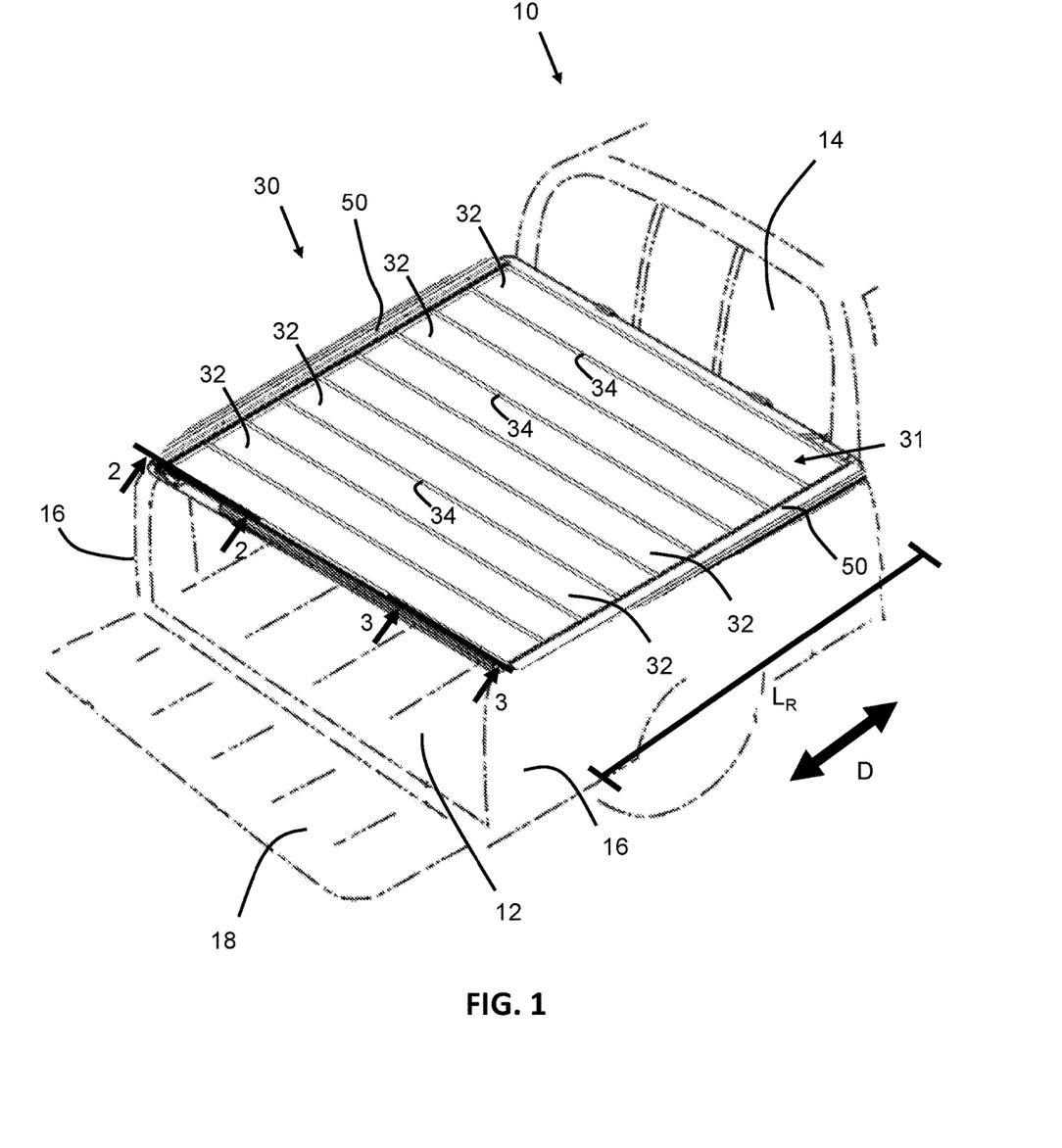
FIG. 1 is a perspective view of a tonneau cover system secured to a cargo box of a vehicle.

Turning now to the figures, FIG. 1 illustrates a perspective view of a vehicle 10. The vehicle 10 includes a cargo box 12 and a passenger cabin 14. The cargo box 12 includes a front wall (not shown), a pair of opposing sidewalls 16, and a tailgate 18. As illustrated, the sidewalls 16 are substantially symmetrically opposite to each other. The vehicle 10 further includes a tonneau cover system 30 disposed over the cargo box 12 and secured to the opposing sidewalls 16 by opposing retainers 50 of the tonneau cover system 30. As shown, the retainers 50 are substantially parallel to each other and have a length ($L_R$) that is substantially equal to a length of the sidewalls 16. The tonneau cover system 30 includes a tonneau cover 31 having a plurality of panels 32 secured within the opposing retainers 50. The plurality of panels 32 may be supported by one or more crossmembers 34. The tonneau cover 31 may be configured to slidably move within the opposing retainers 50 along the length ($L_R$) of the retainers 50 so that the plurality of panels 32 may be rolled onto each other and stored within a canister (not shown) secured within the cargo box 12 (see FIGS. 2 and 3). It is contemplated that the tonneau cover 31 may move in a desired direction D that is substantially parallel to a longitudinal axis (e.g., an axis along the length ($L_R$) of the retainers 50) of at least one of the retainers 50 and that movement deviating from the desired direction D may be substantially or entirely prevented.

Figure 2:
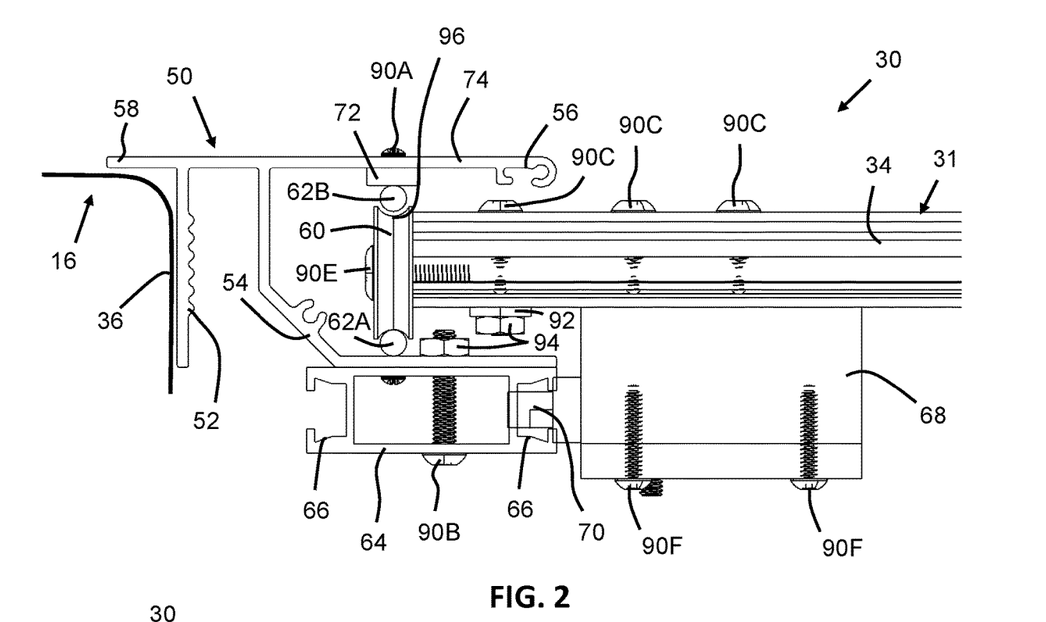
FIG. 2 is cross-section 2-2 of FIG. 1.

FIG. 2 is cross-section 2-2 of the tonneau cover system 30 of FIG. 1. As illustrated, a retainer 50 is secured to a vertical lip 36 of the sidewall 16 of the cargo box. The retainer 50 includes a mounting portion 58 that abuts an upper surface of the sidewall 16 and a contoured projection 52 that abuts the vertical lip 36 so that a plurality of clamps (not shown) clamp together the contoured projection 52 and the vertical lip 36. The retainer 50 further includes a supporting portion 54 that supports the tonneau cover 31 and an engaging portion 74 that substantially seals an upper portion of the tonneau cover 31. The engaging portion 74 includes a slot 56 that secures a seal (not shown) so that the seal compressibly contacts an upper surface of the tonneau cover 31 to prevent moisture, debris, or both from entering the cargo box, an inner portion of the retainer 50, or both. Each crossmember 34 includes a bearing 60 positioned between the supporting portion 54 and the engaging portion 74 and secured to the crossmember 34 via a fastener 90E. However, it should be noted that the bearing 60 may be secured directly to a panel of the tonneau cover system 30 and the panel may be free of a supporting crossmember 34 (see FIGS. 4 and 5). The bearing 60 is positioned between a first rail 62A secured to the supporting portion 54 and a second rail 62B secured to the engaging portion 74 so that the rails 62 are at least partially positioned within a groove 96 of the bearing 60. The bearing 60 is guided along the rails 62 to open and close the tonneau cover 31 by folding and unfolding the plurality of panels of the tonneau cover 31. As illustrated, the second rail 62B is secured to the engaging portion 74 by a rail spacer 72 mounted to the engaging portion 74 by a fastener 90A. The plurality of panels are secured to the crossmembers 34 by a plurality of fasteners 90C. As shown, some of the fasteners 90C may extend through the crossmembers 34 and be secured to the crossmembers 34 by a washer 92 and a nut 94. A lock rail 64 having a plurality of channels 66 is secured to the supporting portion 54 of the retainer 50 by a fastener 90B and a nut 94. A lock 68 mounted to the crossmember 34 by a plurality of fasteners 90F and includes a finger 70 that is guided along one of the channels 66 so that the lock 68 may move simultaneously with the tonneau cover 31.

Figure 3:
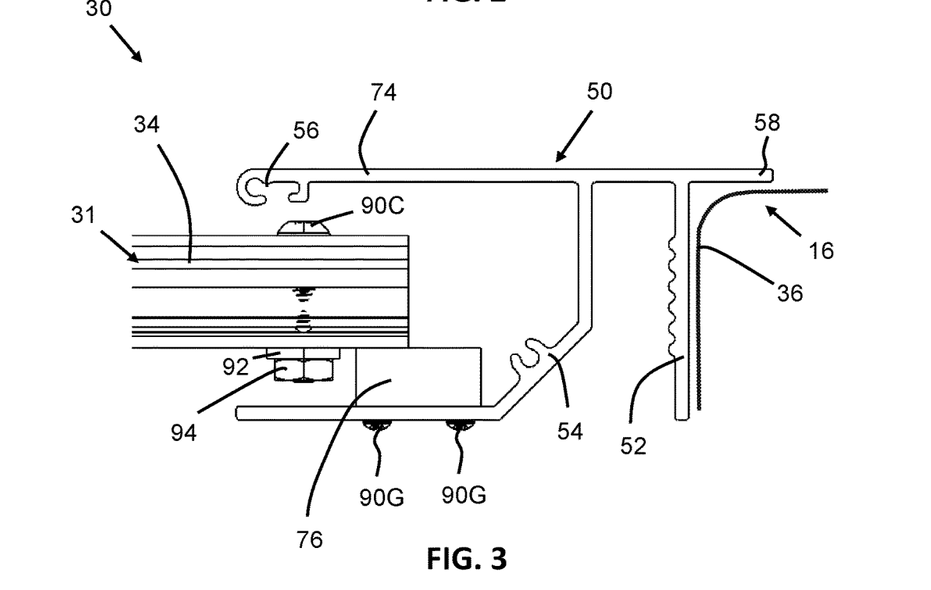
FIG. 3 is cross-section 3-3 of FIG. 1.

FIG. 3 is cross-section 3-3 of the tonneau cover system 30 of FIG. 1. As illustrated, a retainer 50 is secured to a vertical lip 36 of the sidewall 16 of the cargo box. It should be noted that FIG. 3 illustrates an opposing end of the crossmember 34 shown in FIG. 2. The retainer 50 includes a mounting portion 58 that abuts an upper surface of the sidewall 16 and a contoured projection 52 that abuts the vertical lip 36 so that a plurality of clamps (not shown) clamp together the contoured projection 52 and the vertical lip 36. The retainer 50 further includes a supporting portion 54 having a cover spacer 76 mounted to the supporting portion 54 via a plurality of fasteners 90G. The supporting portion 54 and the cover spacer 76 may support a tonneau cover 31 while an engaging portion 74 of the retainer 50 substantially seals an upper portion of the tonneau cover 31. The engaging portion 74 includes a slot 56 the secures a seal (not shown) so that the seal compressibly contacts an upper surface of the tonneau cover 31 to prevent moisture, debris, or both from entering the cargo box, an inner portion of the retainer 50, or both. The tonneau cover 31 may be guided along the cover spacer 76 as the bearing moves along the plurality of rails (see FIG. 2). As illustrated, the plurality of panels are secured to the crossmembers 34 by a plurality of fasteners 90C. The fasteners 90C may extend through the crossmembers 34 and be secured to the crossmembers 34 by a washer 92 and a nut 94.

Figure 4:
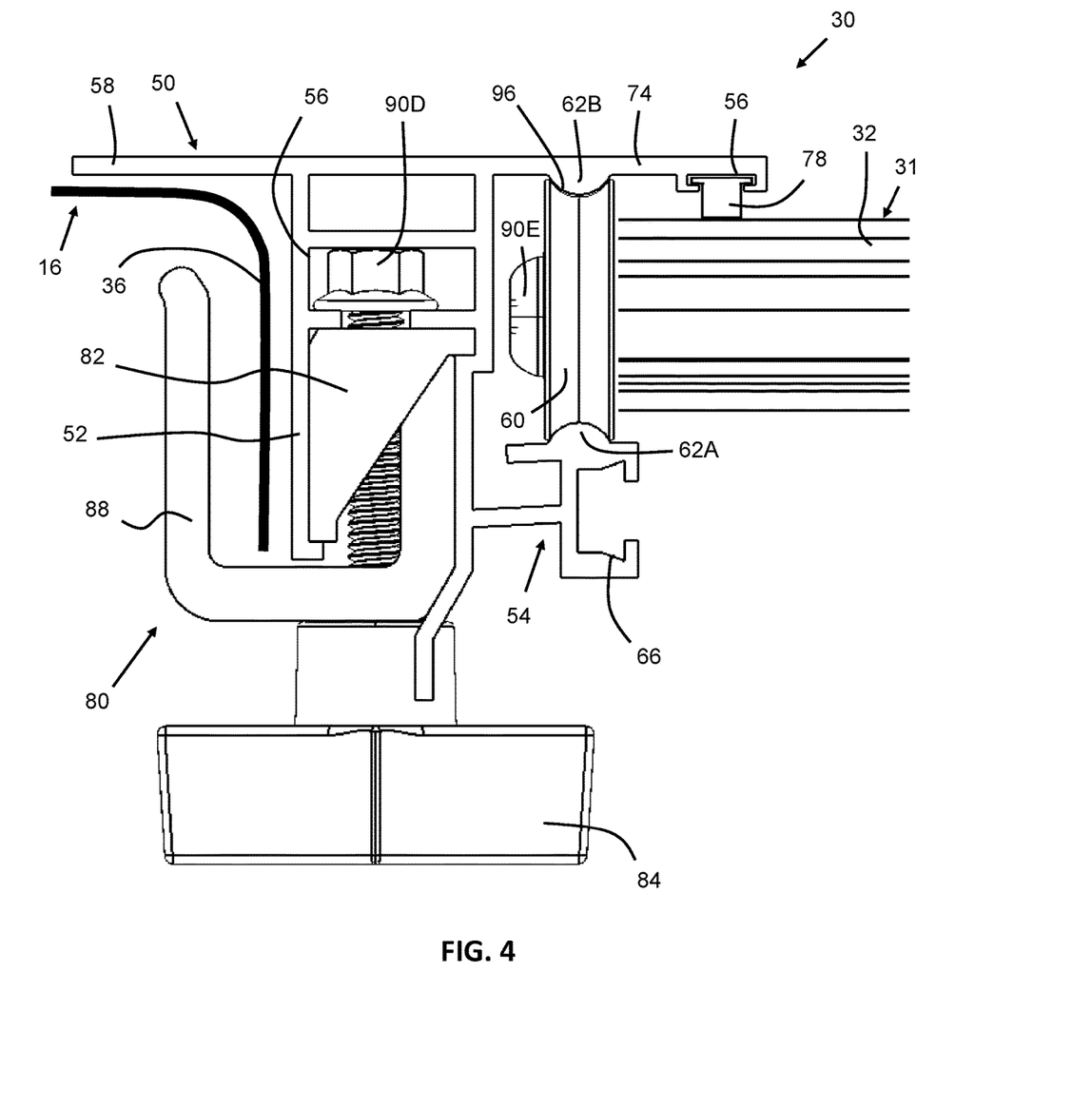
FIG. 4 is a cross-sectional view of a tonneau cover system secured to a sidewall of a cargo box.

FIG. 4 illustrates a cross-sectional view of a tonneau cover system 30 having a panel 32 of a tonneau cover 31 secured within a retainer 50 of the tonneau cover system 30. As shown, the retainer 50 is secured to a vertical lip 36 of a sidewall 16 of a vehicle (not shown). The retainer 50 includes a mounting portion 58 that abuts an upper surface of the sidewall 16 and a contoured projection 52 that abuts the vertical lip 36 so that a clamp 80 may clamp together the contoured projection 52 and the vertical lip 36. The clamp 80 includes a threaded fastener 90D secured in a slot 56 of the retainer 50 that extends through a wedge 82 and a clamping portion 88 of the clamp 80. A cap 84 of the clamp 80 may engage the threading of the fastener 90 to tighten the clamp 80 so that the wedge 82 compressibly contacts the retainer 50 and the clamping portion 88 compressibly contacts the vertical lip 36. The retainer 50 further includes a supporting portion 54 that supports the tonneau cover 31 and an engaging portion 74 that substantially seals an upper portion of the tonneau cover 31. The engaging portion 74 includes a slot 56 that secures a seal 78 so that the seal 78 compressibly contacts an upper surface of the tonneau cover 31 to prevent moisture, debris, or both from entering a cargo box of a vehicle, an inner portion of the retainer 50, or both. The panel 32 includes a bearing 60 positioned between the supporting portion 54 and the engaging portion 74 and secured to the panel 32 via a fastener 90E. The bearing 60 is positioned between a first rail 62A and a second rail 62B so that the rails 62 are at least partially positioned within a groove 96 of the bearing 60. The bearing 60 is guided along the rails 62 to open and close the tonneau cover 31 by folding and unfolding a plurality of panels 32 of the tonneau cover 31 (see FIG. 1). Additionally, the retainer 50 includes a channel 66 configured to receive a portion of a lock of the tonneau cover 31 (not shown; see, for example, FIG. 2).

Figure 5:
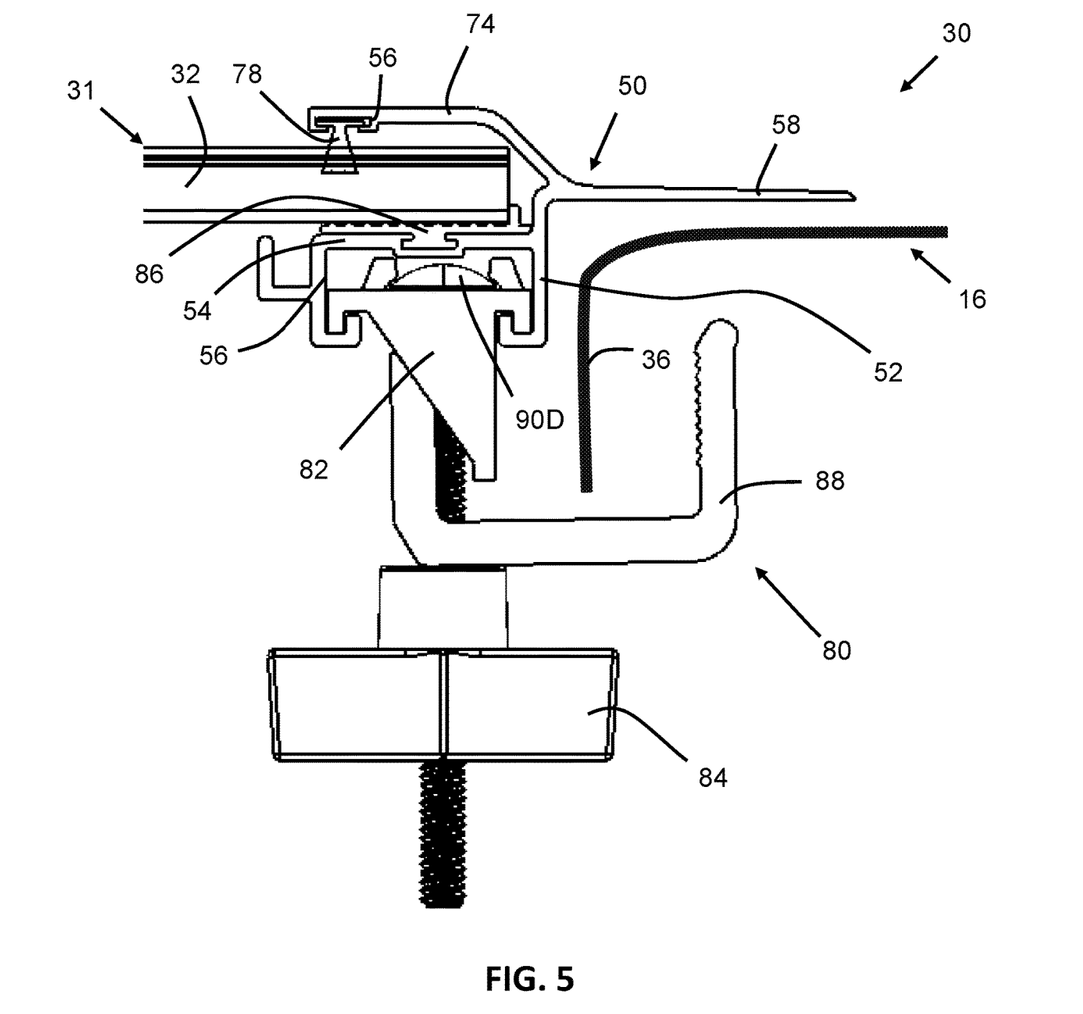
FIG. 5 is a cross-sectional view of the tonneau cover system of FIG. 4 secured to an opposing sidewall of the cargo box.

FIG. 5 illustrates a cross-sectional view of a tonneau cover system 30 having a panel 32 of a tonneau cover 31 secured within a retainer 50 of the tonneau cover system 30. As shown, the retainer 50 is secured to a vertical lip 36 of a sidewall 16 of a vehicle (not shown). It should be noted that FIG. 5 illustrates an opposing end of the panel 32 of FIG. 4. As such, it is contemplated that the retainer 50 shown in FIG. 4 may be used in conjunction with the retainer 50 shown in FIG. 5 so that the retainers 50 may be secured to opposing sidewalls 16 of a cargo box (see FIG. 1). The retainer 50 includes a mounting portion 58 that abuts an upper surface of the sidewall 16 and a contoured projection 52 that abuts the vertical lip 36 so that a clamp 80 may clamp together the contoured projection 52 and the vertical lip 36. The clamp 80 includes a threaded fastener 90D secured in a slot 56 of the retainer 50 that extends through a wedge 82 and a clamping portion 88 of the clamp 80. A cap 84 of the clamp 80 may engage the threading of the fastener 90 to tighten the clamp 80 so that the wedge 82 compressibly contacts the retainer 50 and the clamping portion 88 compressibly contacts the vertical lip 36. The retainer 50 further includes a supporting portion 54 that supports the tonneau cover 31 and an engaging portion 74 that substantially seals an upper portion of the tonneau cover 31. The engaging portion 74 includes a slot 56 that secures a seal 78 so that the seal 78 compressibly contacts an upper surface of the tonneau cover 31 to prevent moisture, debris, or both from entering a cargo box of a vehicle, an inner portion of the retainer 50, or both. As illustrated, the tonneau cover 31 is configured to slide along a sliding contact 86 of the supporting portion 54 so that the tonneau cover 31 may move substantially freely so that the tonneau cover 31 may be opened and closed based on folding and unfolding a plurality of panels 32 (see FIG. 1).

Element List
10 Vehicle
12 Cargo Box
14 Passenger Cabin
16 Sidewall
18 Tailgate
30 Tonneau Cover System
31 Tonneau Cover
32 Panel
34 Crossmember
36 Vertical Lip
50 Retainer
52 Contoured Projection
54 Supporting Portion
56 Slot
58 Mounting Portion
60 Bearing
62 Rail
62A First Rail 62B Second Rail
64 Lock Rail
66 Channel
68 Lock
70 Finger
72 Rail Spacer
74 Engaging Portion
76 Cover Spacer
78 Seal
80 Clamp
82 Wedge
84 Cap
86 Sliding Contact
88 Clamping Portion
90 Fastener
90A Rail Spacer Fastener
90B Lock Rail Fastener
90C Crossmember Fastener
90D Clamp Fastener
90E Bearing Fastener
90F Lock Fastener
90G Cover Spacer Fastener
92 Washer
94 Nut
96 Groove
D Direction of Movement of the Tonneau Cover
$L_R$ Length of the Retainers The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A tonneau cover system, comprising:
   (a) a retractable tonneau cover having a plurality of interconnected panels;
   (b) a first retainer secured to a first sidewall of a cargo box of a vehicle, the first retainer having a supporting portion that supports the tonneau cover, wherein the supporting portion includes a rail; and
   (c) a second retainer secured to an opposing second sidewall of the cargo box, the second retainer being substantially parallel to the first retainer so that the tonneau cover spans between the first retainer and the second retainer, wherein the second retainer includes a sliding contact surface secured to a supporting portion of the second retainer to support the tonneau cover during movement; and
   wherein the plurality of panels each include bearings positioned within the first retainer to guide the tonneau cover in a direction substantially parallel to a longitudinal axis of the first retainer; and
   wherein each bearing includes a groove, and the rail of the supporting portion is at least partially positioned within the groove so that the bearings of each panel is guided along the rail.

2. The tonneau cover system of claim 1, wherein the first retainer prevents vertical or lateral movement of the tonneau cover in a direction other than the direction substantially parallel to the longitudinal axis of the first retainer.

3. The tonneau cover system of claim 1, wherein the bearings rest upon a rail of the first retainer and guides the tonneau cover along the rail.

4. The tonneau cover system of claim 1, wherein the second retainer is free of a rail.

5. The tonneau cover system of claim 4, wherein the sliding contact surface supports the tonneau cover as the tonneau cover is guided along the rail.

6. The tonneau cover system of claim 1, wherein a first end of each panel includes the bearings and is positioned within the first retainer, and a second opposing end of each panel is positioned within the second retainer and is free of bearings.

7. The tonneau cover system of claim 1, wherein the first retainer and the second retainer each include an engaging portion having a seal that compressibly contacts the tonneau cover to prevent moisture, debris, or both from entering the retainers.

8. The tonneau cover system of claim 1, wherein the first retainer and the second retainer each include:
(a) a contoured projection that is configured to abut a vertical lip of the sidewalls;
(b) a mounting portion that abuts a portion of the sidewalls so that the sidewalls at least partially support the retainers;
(c) a supporting portion that at least partially supports the tonneau cover, wherein the supporting portion guides the tonneau cover along the direction substantially parallel to the longitudinal axis of the first retainer; and
(d) an engaging portion, the engaging portion including a seal that compressibly contacts the tonneau cover to prevent moisture, debris, or both from entering the retainers.

9. The tonneau cover system of claim 1, wherein the rail is spaced apart from a surface of the supporting portion by a spacer.

10. The tonneau cover system of claim 1, wherein each bearing is secured to each corresponding panel by a threaded fastener so that each bearing and each corresponding panel are substantially coaxial.

11. The tonneau cover system of claim 1, wherein the bearings of each panel are secured to a terminal end of a crossmember of the panel.

12. A tonneau cover system, comprising:
(a) a retractable tonneau cover having a plurality of interconnected panels, at least a portion of the plurality of panels having a bearing secured near a terminal end;
(b) opposing retainers secured to opposing sidewalls of a cargo box of a vehicle so that the tonneau cover extends between the opposing retainers, wherein the tonneau cover is supported by a supporting portion an inner surface of each retainer; and
(c) a lock rail mounted along an outer surface of the supporting portion of one of the retainers free of interference with the inner surface of the supporting portion that receives the tonneau cover, wherein the lock rail engages a lock mounted to the tonneau cover and the lock includes a finger that is guided along a channel of the lock rail so that the lock moves simultaneously with the tonneau cover;
wherein at least one of the opposing retainers includes opposing rails positioned within the supporting portion and a groove of the bearings is guided along the opposing rails to move the tonneau cover.

13. The tonneau cover system of claim 12, wherein a first retainer includes the opposing rails and a second retainer is free of any rails.

14. The tonneau cover system of claim 13, wherein the second retainer includes a sliding contact surface that supports the tonneau cover as the tonneau cover is guided along the opposing rail of the first retainer.

15. The tonneau cover system of claim 12, wherein at least one of the opposing rails is spaced apart from the supporting portion by a spacer secured to the supporting portion by one or more fasteners.

16. The tonneau cover system of claim 12, wherein the first retainer prevents vertical and lateral movement of the tonneau cover in a direction other than a direction substantially parallel to a longitudinal axis of the first retainer.

17. The tonneau cover system of claim 12, wherein the opposing retainers each further include:
(a) a contoured projection that is configured to abut a vertical lip of the sidewalls;
(b) a mounting portion that abuts a portion of the sidewalls so that the sidewalls at least partially support the retainers; and
(c) an engaging portion, the engaging portion including a seal that compressibly contacts the tonneau cover to prevent moisture, debris, or both from entering the opposing retainers.

18. The tonneau cover system of claim 17, wherein the bearing of each panel is secured to a terminal end of a crossmember of the panel.

19. The tonneau cover system of claim 12, wherein the lock is mounted to one of the plurality of panels so that the finger of the lock is positioned beneath the plurality of panels.

* * * * *